United States Patent
Nagoya (10) Patent No.: US 8,471,924 B2
(45) Date of Patent: Jun. 25, 2013

(54) INFORMATION PROCESSING APPARATUS FOR REMOTE OPERATION OF AN IMAGING APPARATUS AND CONTROL METHOD THEREFOR

(75) Inventor: Miho Nagoya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/845,242

(22) Filed: Jul. 28, 2010

(65) Prior Publication Data

US 2011/0050927 A1   Mar. 3, 2011

(30) Foreign Application Priority Data

Aug. 31, 2009 (JP) .................................. 2009-201090

(51) Int. Cl.
*H04N 9/73* (2006.01)
*H04N 5/222* (2006.01)

(52) U.S. Cl.
USPC .................................. 348/223.1; 348/333.02

(58) Field of Classification Search
USPC .......... 348/222.1–223.1, 211.3–211.4, 211.8, 348/333.01–333.03
See application file for complete search history.

(56) References Cited

U.S. PATENT DOCUMENTS

| | | | |
|---|---|---|---|
| 6,285,398 B1* | 9/2001 | Shinsky et al. | 348/223.1 |
| 8,248,509 B2* | 8/2012 | Shirai | 348/335 |
| 2003/0234866 A1* | 12/2003 | Cutler | 348/207.1 |
| 2004/0130631 A1* | 7/2004 | Suh | 348/222.1 |
| 2004/0201767 A1* | 10/2004 | Niikawa et al. | 348/333.03 |
| 2005/0128316 A1* | 6/2005 | Sugimori | 348/223.1 |
| 2007/0103560 A1 | 5/2007 | Suga et al. | |
| 2010/0026836 A1* | 2/2010 | Sugimoto | 348/223.1 |

FOREIGN PATENT DOCUMENTS

| | | |
|---|---|---|
| JP | 07-135594 | 5/1995 |
| JP | 2004-086031 | 3/2004 |

* cited by examiner

*Primary Examiner* — Kelly L Jerabek (74) *Attorney, Agent, or Firm* — Cowan, Liebowitz & Latman, P.C.

(57) ABSTRACT

An information processing apparatus receives images from the image capturing apparatus and displays them on a screen. The information processing apparatus then receives the designation of an image area by a user with respect to an image displayed on the screen, and calculates white balance information based on color information from the designated image area of the image displayed when the designation was received. The apparatus determines, based on the color information of the image area on the image displayed when the designation was received and the color information of image areas on a predetermined number of images received before the image, whether the white balance information to be calculated is proper. Upon determining that the information is proper, the apparatus applies the calculated white balance information to the image capturing apparatus. Upon determining that the information is not proper, the apparatus issues a corresponding warning.

8 Claims, 7 Drawing Sheets

INFORMATION PROCESSING APPARATUS FOR REMOTE OPERATION OF AN IMAGING APPARATUS AND CONTROL METHOD THEREFOR

BACKGROUND OF THE INVENTION

1. Field of the Invention

The present invention relates to an information processing apparatus that changes capturing conditions by remotely controlling, from a control apparatus, an image capturing apparatus connected to the control apparatus, and a control method for the information processing apparatus.

2. Description of the Related Art

With recent advances in the digitalization of image capturing apparatuses, electronic image capturing devices capable of obtaining captured images as digital data, for example, digital cameras and digital video cameras, have become popular. These electronic image capturing devices have their features in that they are connected to external devices such as personal computers (PCs) and portable terminals, can transfer data to the external devices, and can be remotely controlled from the external devices. For this reason, among professional users, image capturing based on remote control has gained popularity. Such image capturing includes, for example, controlling an image capturing apparatus installed in a place where the user cannot enter and checking images on the large screen of an external device while performing image capturing using the image capturing apparatus.

In addition, an increasing number of digital single-lens reflex cameras are equipped with a live view function which allows to check an object on a liquid crystal monitor. This has diversified image capturing methods based on remote control, which include, for example, a method of performing still image capturing or moving image capturing while making an external device display a live view image displayed by the live view function and checking the image in real time.

In practice, an image capturing apparatus such as a digital camera is connected to a PC via a cable, and the user performs image capturing by using a remote control application installed in the PC. In this case, the user can also change capturing conditions by remote control. For example, Japanese Patent Laid-Open No. 07-135594 discloses a technique of implementing white balance adjustment manually from a control apparatus by sending the positional information of the position designated with a pointing device of the control apparatus to an image capturing apparatus and making the image capturing apparatus calculate a white balance coefficient. In addition, Japanese Patent Laid-Open No. 2004-086031 has proposed an arrangement in which when a correction area subjected to white balance correction (or black balance correction) is designated for an observed image captured by a microscopic image capturing apparatus, it is determined whether the designated correction area is proper. In this case, if it is determined that an erroneous correction area is designated, this arrangement uses a correction value stored in advance in a correction determination unit or displays a predetermined message.

The technique disclosed in Japanese Patent Laid-Open No. 07-135594 described above makes the control apparatus display the live view image obtained by the image capturing apparatus and designates white point to allow the user to manually perform white balance adjustment while seeing the image. The user therefore acquires the coordinate points for the designation of white points from live view images which sequentially change, and hence a timing offset occurs between an image and white point designation. Correct white balance information cannot therefore be always acquired.

Figure 5A:
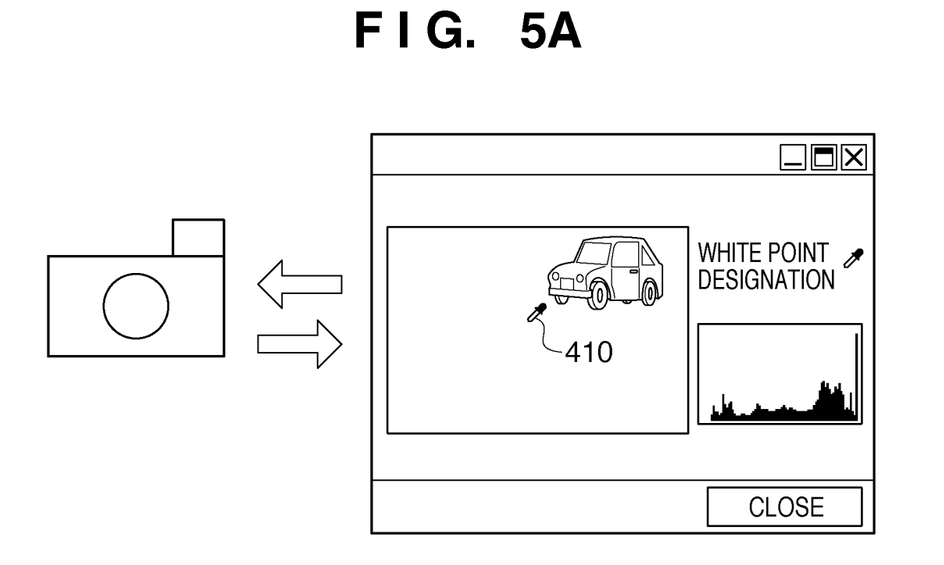
FIGS. 5A and 5B are views showing a problem in white balance control in remote live view capturing.
Figure 5B:
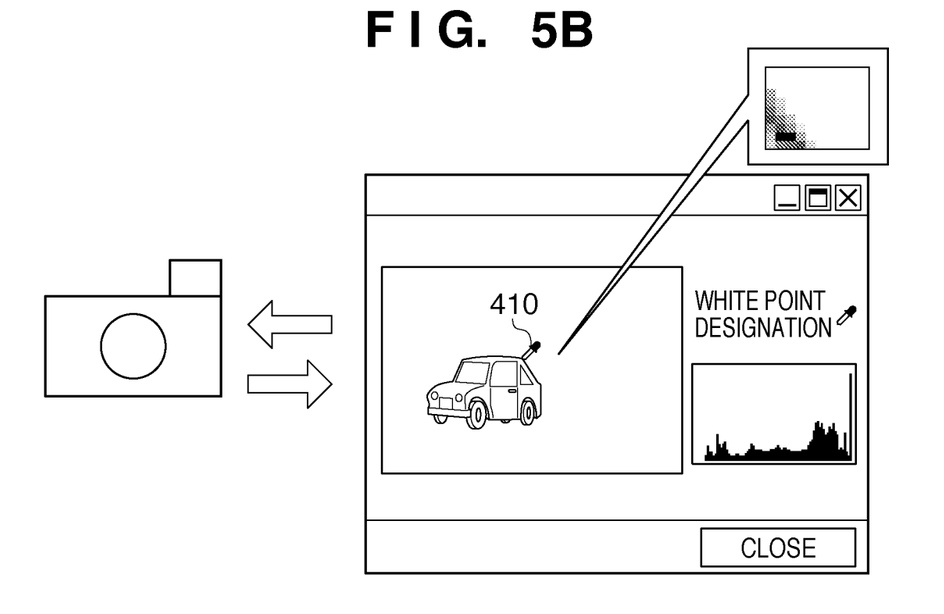

When, for example, the user designates a white color area with a white color designation icon 410 in FIG. 5A, the displayed image switches to the image displayed in FIG. 5B at the instant when the user designates the area. As a consequence, a portion unintended by the user may be designated. Applying such improper white balance information may obtain a white balance application result unintended by the user. There has been no way to recognize the application of improper white balance information.

The technique disclosed in Japanese Patent Laid-Open No. 2004-086031 is for one still image after image capturing, and hence does not allow to correctly determine the properness of calculated white balance information even when being applied to a live view image having a moving object. Even if this technique is applied to a live view image, white balance correction to be automatically executed when it is determined that white balance correction is designated by improper white point designation uses a correction value for one still image. For this reason, it is not necessarily possible to obtain a white balance correction result suitable for a live view.

SUMMARY OF THE INVENTION

According to an embodiment of the present invention, there are provided an information processing apparatus, which can determine whether white balance information to be applied is proper in white balance adjustment, performed by remote control upon designation of a white color area on a live view image, and a control method for the apparatus.

According to one aspect of the present invention, there is provided an information processing apparatus which allows remote operation of an image capturing apparatus by communicating with the image capturing apparatus via a communication unit, the apparatus comprising: a display unit configured to continuously receive images from the image capturing apparatus and display the images as a moving image; a reception unit configured to receive designation of an image area by a user with respect to an image displayed on the display unit; a first calculation unit configured to calculate white balance information based on color information in the image area of the image displayed when the reception unit received the designation; a determination unit configured to determine, based on color information of the image area on the image displayed when the designation was received and color information of image areas on a predetermined number of images received before the image, whether white balance information calculated by the first calculation unit is proper; and an applying unit configured to apply white balance information calculated by the first calculation unit to the image capturing apparatus when the determination unit determines that the white balance information is proper.

According to another aspect of the present invention, there is provided a control method for an information processing apparatus which allows remote operation of an image capturing apparatus by communicating with the image capturing apparatus via a communication unit, the method comprising the steps of: displaying images continuously received from the image capturing apparatus as a moving image; receiving designation of an image area by a user with respect to an image displayed in the displaying step; calculating white balance information based on color information in the image area of the image displayed when the designation was received in the receiving step; determining, based on color information of the image area on the image displayed when the designation was received and color information of image areas on a predetermined number of images received before the image, whether white balance information calculated in the calculating step is proper; and applying white balance information calculated in the calculating step to the image capturing apparatus when it is determined in the determining step that the white balance information is proper.

Further features of the present invention will become apparent form the following description of exemplary embodiments with reference to the attached drawings.

DESCRIPTION OF THE EMBODIMENTS

The preferred embodiments of the present invention will be described in detail below with reference to the accompanying drawings.

First Embodiment

Figure 1:
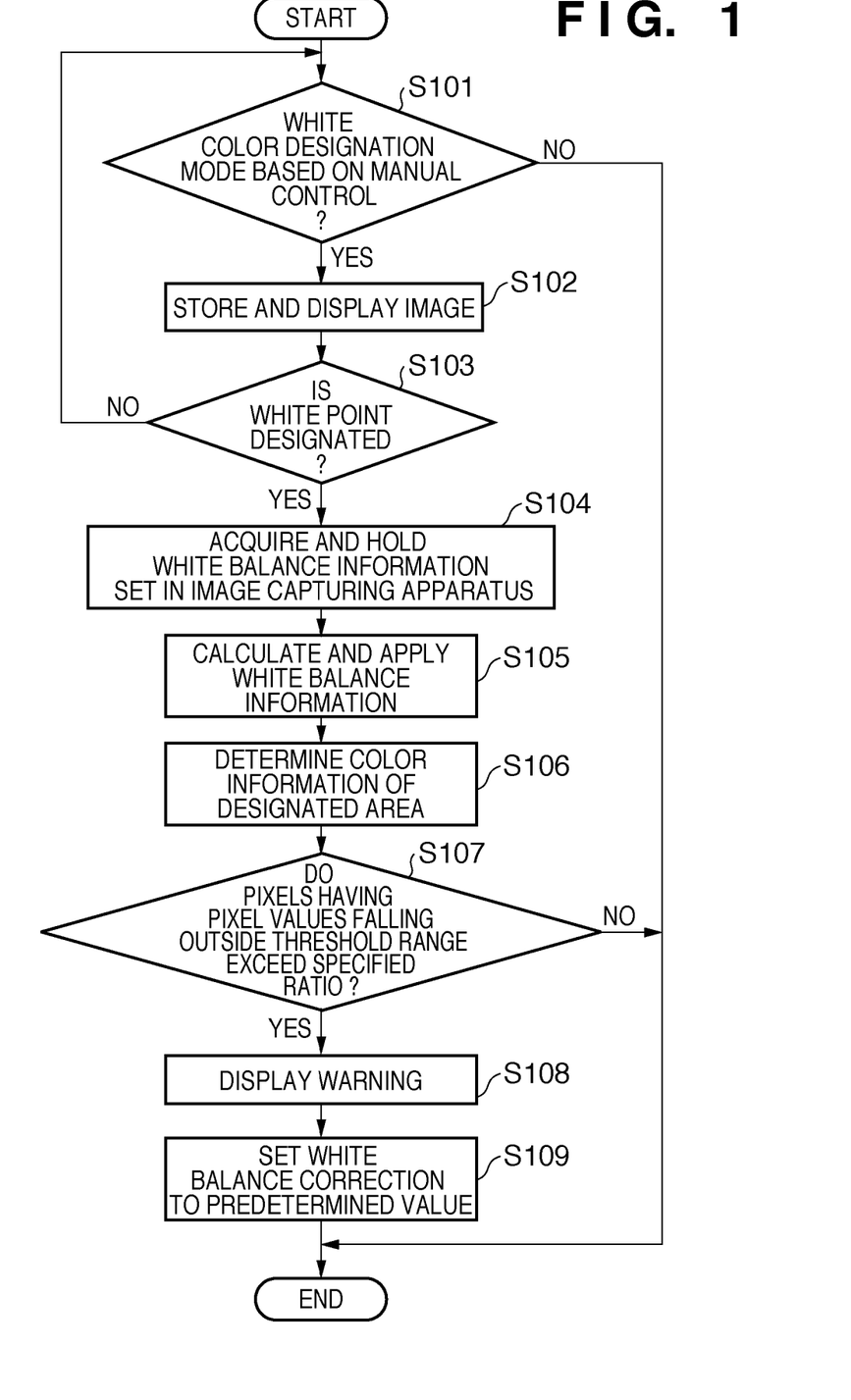
FIG. 1 is a flowchart showing white balance adjustment processing according to the first embodiment.
Figure 2:
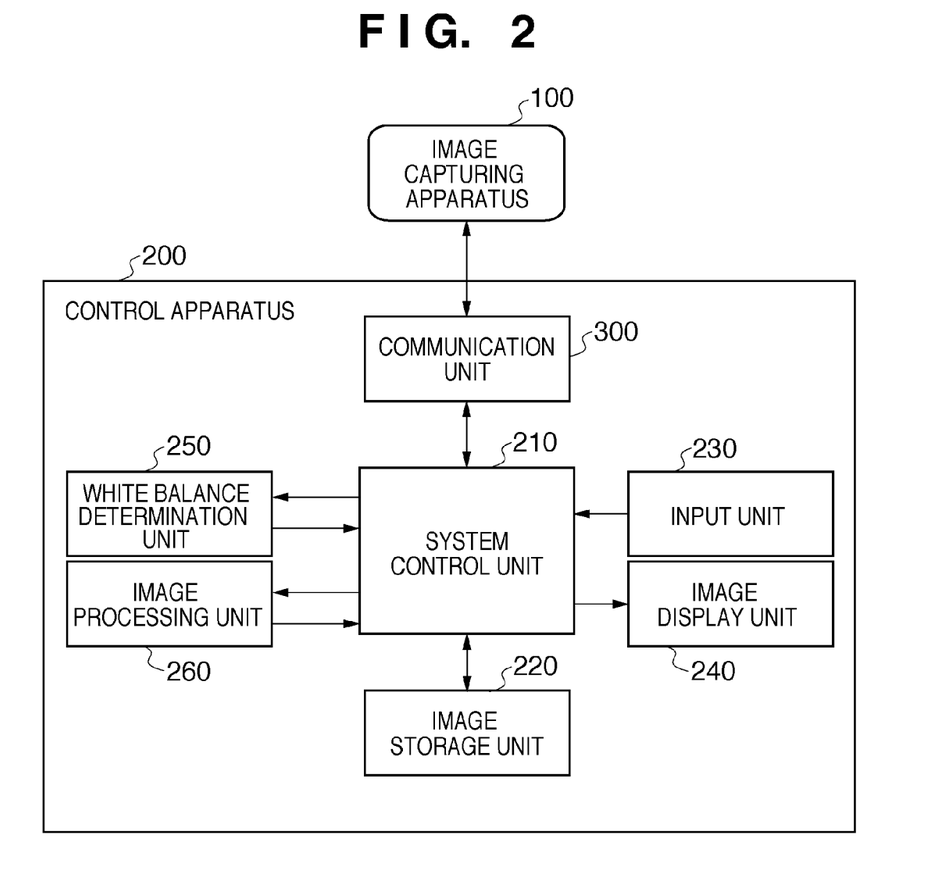
FIG. 2 is a block diagram showing the main components of a control apparatus 200 according to this embodiment.

A method to manually perform white balance adjustment for a live view image by remote control according to the first embodiment of the present invention will be described next with reference to FIGS. 1 and 2. FIG. 1 is a flowchart showing a processing procedure for white balance adjustment by a control apparatus in remote live view capturing. FIG. 2 is a block diagram showing the main components of a control apparatus 200 according to this embodiment. Note that a value (correction value or coefficient) for white balance adjustment will be referred to as white balance information. As the control apparatus 200, any type of information processing apparatus such as a general personal computer can be used.

In the control apparatus 200, a communication unit 300 receives captured image data and image information from an image capturing apparatus 100. By transmitting and receiving data via the communication unit 300, the control apparatus 200 can remotely operate the image capturing apparatus 100. A connection method for data transmission/reception can use a known communication form such as a USB, wireless LAN, or wired LAN. In remote live view capturing, the communication unit 300 continuously receives images (frames) from the image capturing apparatus 100, and an image display unit 240 displays the received images as a moving image.

In the control apparatus 200, a system control unit 210 switches to a white color designation mode based on manual control in accordance with user operation via an input unit 230 (S101). Upon switching to the white color designation mode, the system control unit 210 stores, in an image storage unit 220, captured image data (live view data) continuously received via the communication unit 300, and displays the data on the screen of the image display unit 240 (S102). The system control unit 210 determines whether the user has designated a coordinate point on a displayed image as a white point (which operation will be referred as white point designation) using the input unit 230 to manually perform white balance adjustment (S103). Upon determining that white point designation is performed, the system control unit 210 acquires white balance information currently set in the image capturing apparatus 100 via the communication unit 300, and holds the information in a memory (not shown) (S104). Note that white point designation methods include, for example, a method of receiving the coordinate point input of one point by operating the mouse cursor (denoted by, for example, reference numeral 410 in FIG. 4A) and performing click operation, and deciding, as a white point designation area, an image area of 10×10 pixels including the coordinate position of the coordinate point in the central portion. When the control apparatus 200 is enlarging and displaying captured image data, it is possible to change the white point designation area, for example, set an image area of 20×20 pixels as a white point designation area, in accordance with the display state. However, the size of the area is not limited to the above case, and it is possible to use a method of making the user designate the size of an area.

An image processing unit 260 calculates white balance information based on the color information of the white point designation area in the frame displayed when the white point is designated (to be referred to as the current frame hereinafter) (first calculation processing). White balance adjustment based on the white balance information calculated in the first calculation processing is applied to the image capturing apparatus 100 (S105). The control apparatus 200 performs this operation by transmitting the calculated white balance information to the image capturing apparatus 100 via the communication unit 300. The white balance determination unit 250 then determines whether the calculated white balance information is proper. In this embodiment, the system control unit 210 determines whether the ratio between the number of pixels having pixel values falling outside a preset threshold range and the total number of pixels in the white point designation area of each of the current frame and a predetermined number of preceding frames stored in the image storage unit 220 exceeds a specified ratio (S106 and S107). If, for example, the specified ratio is W % and a white color designation area has a size of 10×10 pixels (the total number of pixels is 100), the system control unit 210 determines whether the number of pixels having pixel values falling outside the threshold range exceeds 100×(W/100). Upon finding a frame in which pixels having pixel values falling outside the threshold range exist beyond the specified ratio, the system control unit 210 causes the image display unit 240 to display a warning indicating that the calculated white balance information is not proper (S108). The system control unit 210 then sets the white balance information to a predetermined value (S109). In this embodiment, the system control unit 210 notifies the image capturing apparatus 100 of the white balance information held in step S104, and returns the white balance to the state before the application of the white balance information in step S105. Note that in step S109, the system control unit 210 can use the white balance information obtained by the processing in step S206 to be described in the second embodiment as a predetermined value.

Note that the threshold ranges for pixel values in steps S106 and S107 are, for example, 73 to 250 for R, 73 to 250 for G, and 73 to 250 for B. The system control unit 210 then scans the above white point designation area (10×10 (20×20 at the time of enlargement) pixels), and determines whether pixels of the pixels in the white point designation area, which correspond in number to the specified ratio fall outside the threshold range.

In the first calculation processing in step S105, white balance information is calculated by using the color information of the white point designation area of the current frame. However, the present invention is not limited to this. For example, it is possible to calculate white balance information by using the color information of white point designation areas in a plurality of frames including the current frame and past frames. In this case, for example, it is possible to calculate white balance information by using the average of the color information acquired from the white point designation area in a plurality of frames. Note, however, that in this case, the system control unit 210 determines in steps S106 and S107 whether pixels having pixel values falling outside a preset threshold range exist beyond a specified ratio within the white point designation area in each of the plurality of frames. If there is at least one frame in which pixels having pixel values falling outside the preset threshold range exist beyond the specified ratio, the system control unit 210 determines that the value for white balance correction is not proper.

It is possible to perform the processing in step S105 (calculating and applying white balance information) after NO in step S107. In this case, since white balance information determined as improper is not applied, the use of the white balance information held in step S104 as a predetermined value in the processing in step S109 will eliminate the necessity of the processing in step S109.

As described above, the first embodiment can prevent improper white balance information from being applied to the image capturing apparatus 100, and notifies the user of a corresponding warning. Note that a warning may be displayed to inquire the user whether to apply the white balance information calculated in step S105 without any change. If the user designates "application" in response to this inquiry, the system control unit 210 applies the white balance information without any change even if the information is determined as improper in step S107. This arrangement allows the user to decide whether to apply the white balance information determined as improper, after checking the state in which the white balance information calculated in step S105 is applied.

Second Embodiment

Figure 3:
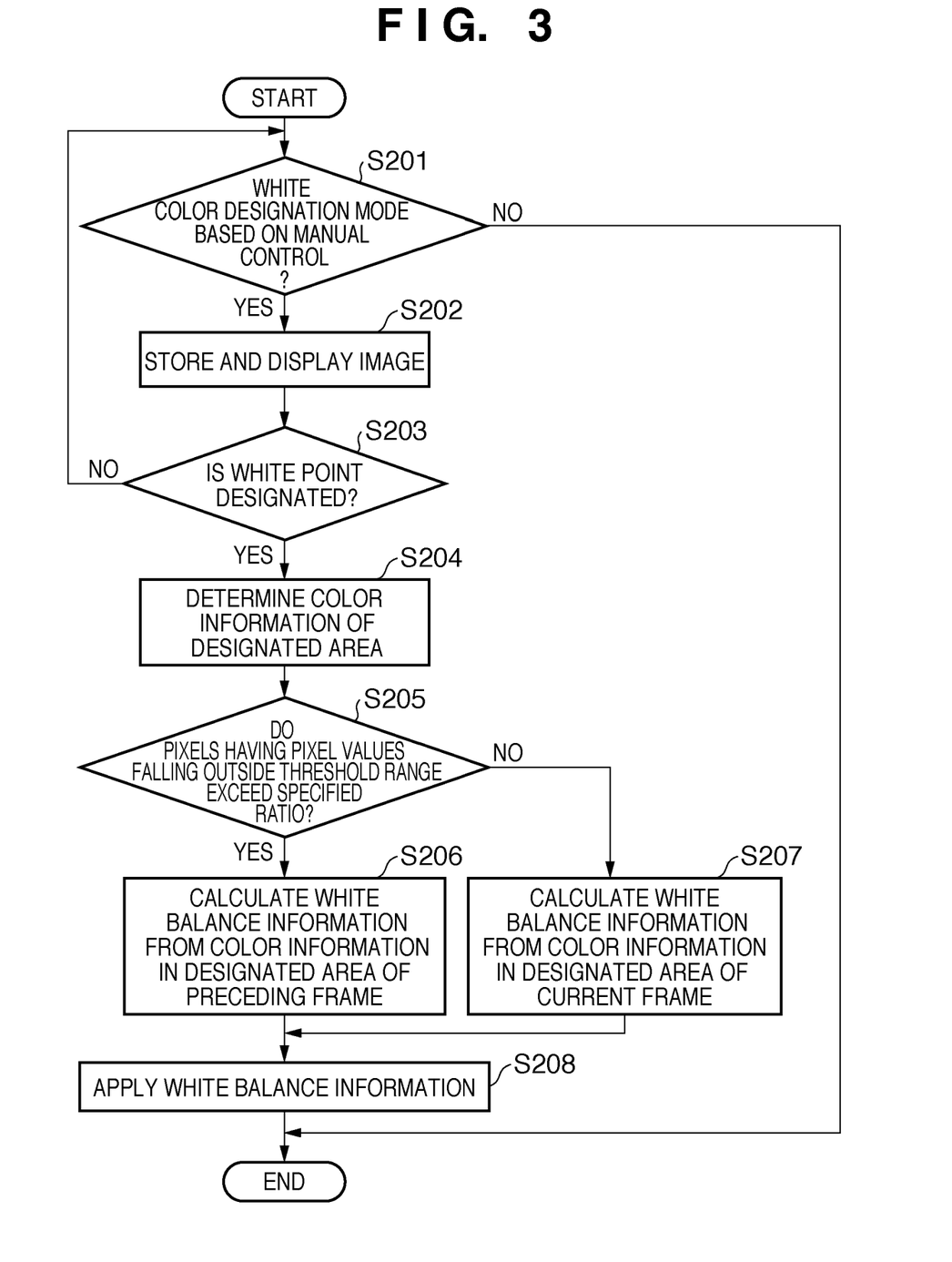
FIG. 3 is a flowchart showing white balance adjustment processing according to the second embodiment.

A method of manually performing white balance adjustment of a live view image by remote control according to the second embodiment of the present invention will be described below with reference to FIGS. 2 and 3.

In a control apparatus 200, a system control unit 210 switches to the white color designation mode based on manual control upon user operation via an input unit 230 (S201). When switching to the white color designation mode, the system control unit 210 displays live view images continuously received from an image capturing apparatus 100 via a communication unit 300 on the screen of an image display unit 240 while storing the images in an image storage unit 220 by a predetermined number of frames (S202). The image storage unit 220 stores a predetermined number of recent frames. When the user designates a coordinate point on a displayed image as a white point via the input unit 230 to manually perform white balance adjustment (S203), the system control unit 210 specifies a white color designation area. As in the first embodiment (S106 and S107), white balance determination unit 250 determines, based on the color information of a specified white point designation area, whether white balance information can be properly calculated (S204 and S205).

As in the first embodiment, the white balance determination unit 250 determines whether pixels having pixel values falling outside a preset threshold range exist at the specified ratio or more within the white color designation area of each of the current frame and a predetermined number of preceding frames (S205). Upon finding a frame in which pixels having pixel values falling outside the preset threshold range exist at the specified ratio or more, the white balance determination unit 250 determines that it cannot calculate white balance information for proper white balance correction, and the process advances to step S206. The white balance determination unit 250 then performs the second calculation processing of calculating alternative white balance information from color information in a white point designation area in each of the current frame and a predetermined number of preceding frames (S206). The white balance information obtained by the second calculation processing is then applied to the image capturing apparatus 100 (S208). The second calculation processing includes, for example, the processing of obtaining white balance information by averaging pieces of color information in white point designation areas obtained from a predetermined number of frames. Note that it is possible to use, as the plurality of frames, a predetermined number of frames extracted from frames a predetermined period of time or more before the current frame. For example, five frames in the retrospective direction from the frame 10 frames before the current frame may be extracted as the plurality of frames. In contrast, if the number of pixels having pixel values falling within the predetermined threshold range is within the specified ratio (S205), the white balance determination unit 250 executes the first calculation processing of calculating white balance information by using color information in the white point designation area in the current frame (S207). The white balance information obtained by the first calculation processing is then applied to the image capturing apparatus 100 (S208).

Note that in step S206, the white balance determination unit 250 may calculate white balance information from the color information of a plurality of frames preceding the current frame or one frame at a predetermined position before the current frame as a whole. Alternatively, the white balance determination unit 250 may calculate white balance information by using only pixels, of the pixels in an entire frame or a designated area, which have color information within the above threshold.

Alternatively, in step S206, the white balance determination unit 250 may extract a predetermined number of frames which precede the current frame and for which NO is obtained in step S205 and calculate white balance information by using the color information (for example, the average value) of white point designation areas in the extracted frames.

In step S207, the white balance determination unit 250 may calculate white balance information by using the color information of white color designation areas in a plurality of frames, for example, the current frame and frames preceding the current frame, as described in association with step S105.

As described above, the second embodiment can prevent improper white balance information from being applied to the image capturing apparatus 100 and obtain proper white balance information by acquiring the color information of a white point designation area from past frames.

Third Embodiment

A method of manually performing white balance adjustment of live view images by remote control according to the third embodiment of the present invention will be described below with reference to FIGS. 2, 4A, 4B, 6, and 7.

Figure 4A:
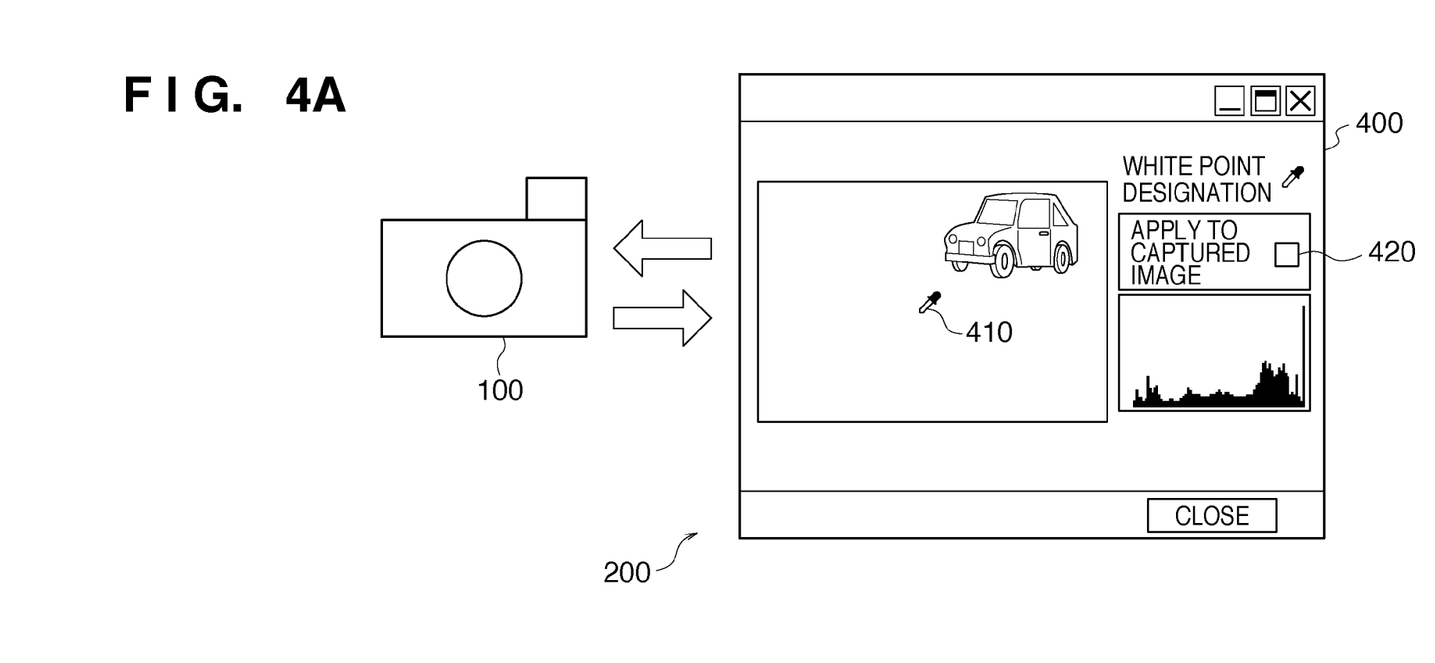
FIGS. 4A and 4B are views showing an example of a user interface for white balance adjustment.
Figure 4B:
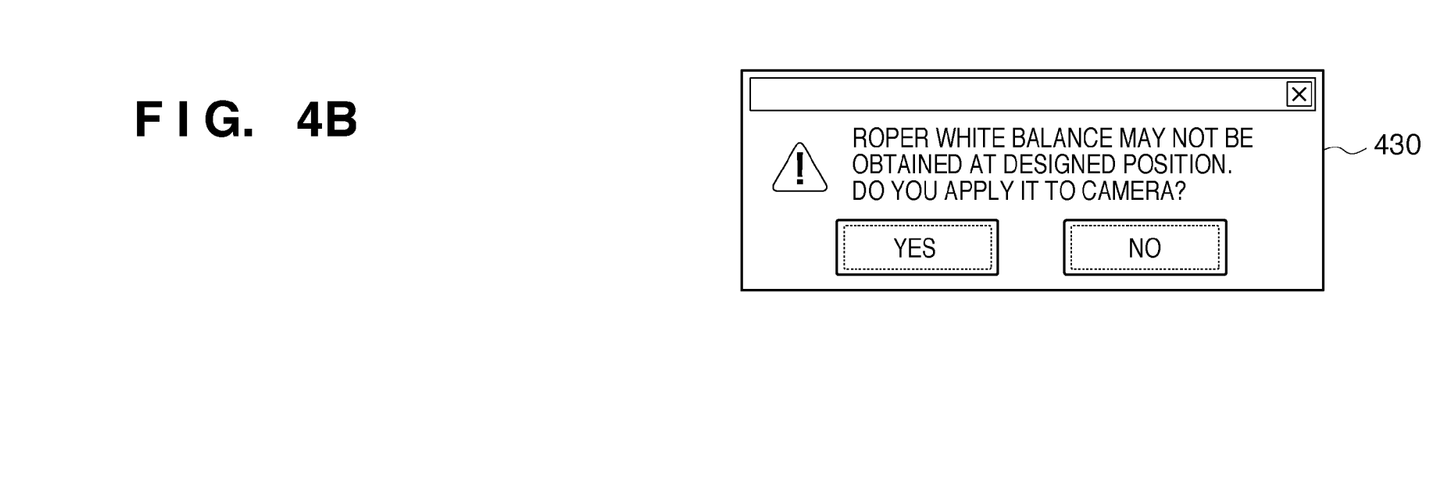

The third embodiment can instruct a control apparatus 200 to or not to apply white balance information, used in the first and second embodiments, to only the image displayed on the screen of an image display unit 240. For this purpose, as shown in FIG. 4A, a user interface 400 includes a check box 420 of "apply to captured image" which allows the user to select whether to apply white balance information to both the image displayed on an image display unit and an image capturing apparatus 100. Note that a mouse cursor 410 is used for white point designation for white balance adjustment.

Assume that the check box 420 of "apply to captured image" is OFF. In this case, even if white balance information is improper, the white balance information is applied to the image on the image display unit 240 without any warning. Assume that the check box 420 of "apply to captured image" is ON. In this case, if white balance information is improper, a warning message 430 (FIG. 4B) indicating that proper white balance adjustment cannot be performed at a designated position is displayed. The user is then made to select whether to apply the white balance information. Note that the default of the check box 420 "apply to captured image" is "ON".

Figure 6:
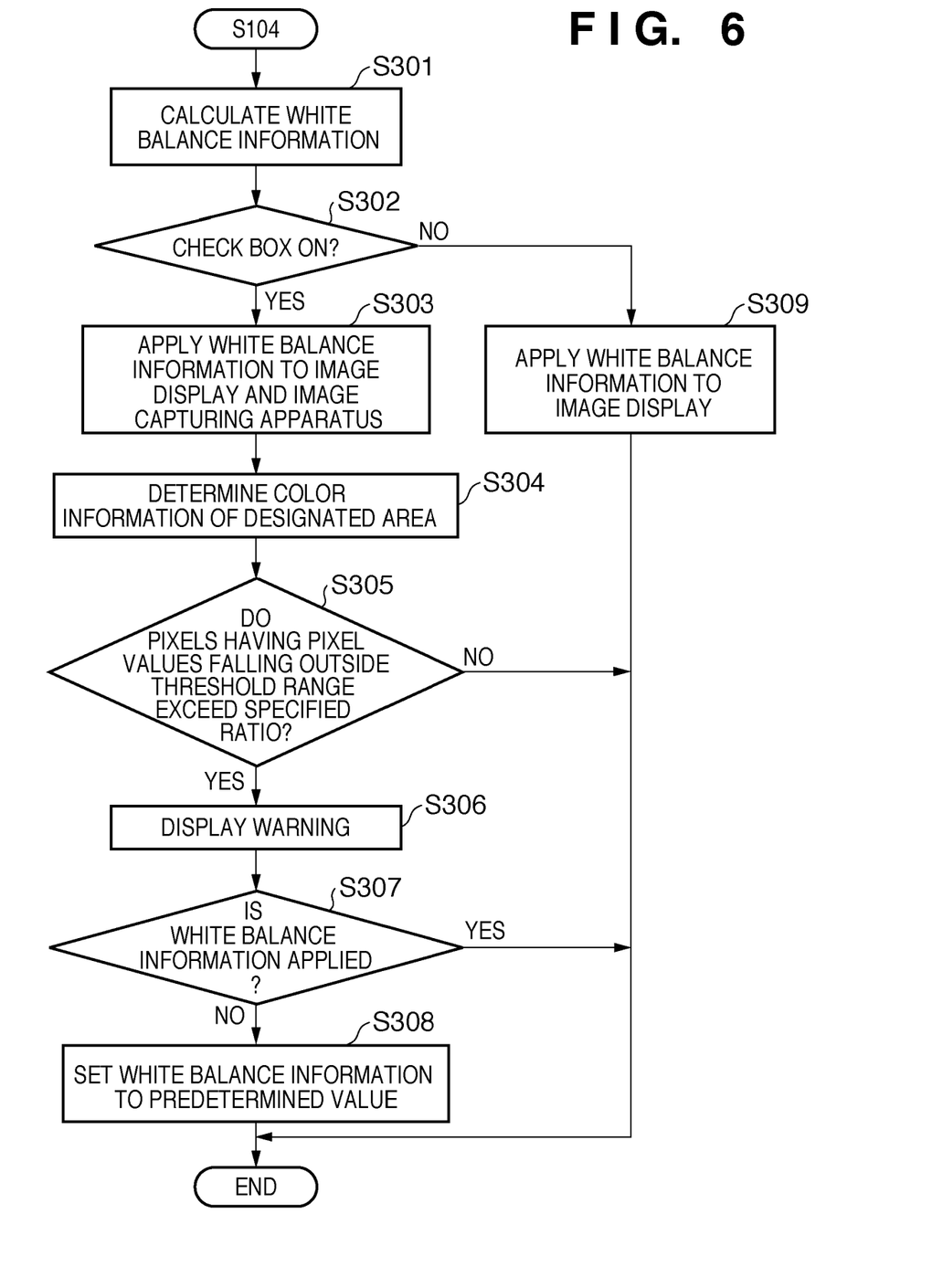
FIG. 6 is a flowchart showing white balance adjustment processing according to the third embodiment.

FIG. 6 is a flowchart showing an example of processing according to the third embodiment. When the processing in step S104 shown in FIG. 1 is complete, a system control unit 210 calculates white balance information (S301). White balance information is calculated in the same manner as described in association with step S105. The system control unit 210 then checks whether the check box 420 is ON or OFF (S302). If the check box 420 is OFF, the system control unit 210 immediately applies the white balance information calculated in step S301 to image display on the image display unit 240, and terminates this processing (S309). If the check box 420 is ON, the system control unit 210 applies the white balance information calculated in step S301 to the image display and the image capturing apparatus 100 (S303). The system control unit 210 determines by the method described in association with steps S106 and S107 whether the white balance information is proper (S304 and S305). Upon determining that the information is proper (NO in step S305), the system control unit 210 immediately terminates the processing. Upon determining that the information is not proper (YES in step S305), the system control unit 210 displays the warning message 430 shown in FIG. 4B (S306). If the user selects "YES" on the warning message 430, the system control unit 210 immediately terminates the processing (S307). With this operation, the system control unit 210 keeps applying the white balance information calculated in step S301 to the image capturing apparatus 100 and the image display. If the user selects "NO" on the warning message 430, the system control unit 210 applies the white balance information held in step S104 to the image display and the image capturing apparatus 100 (S308).

Figure 7:
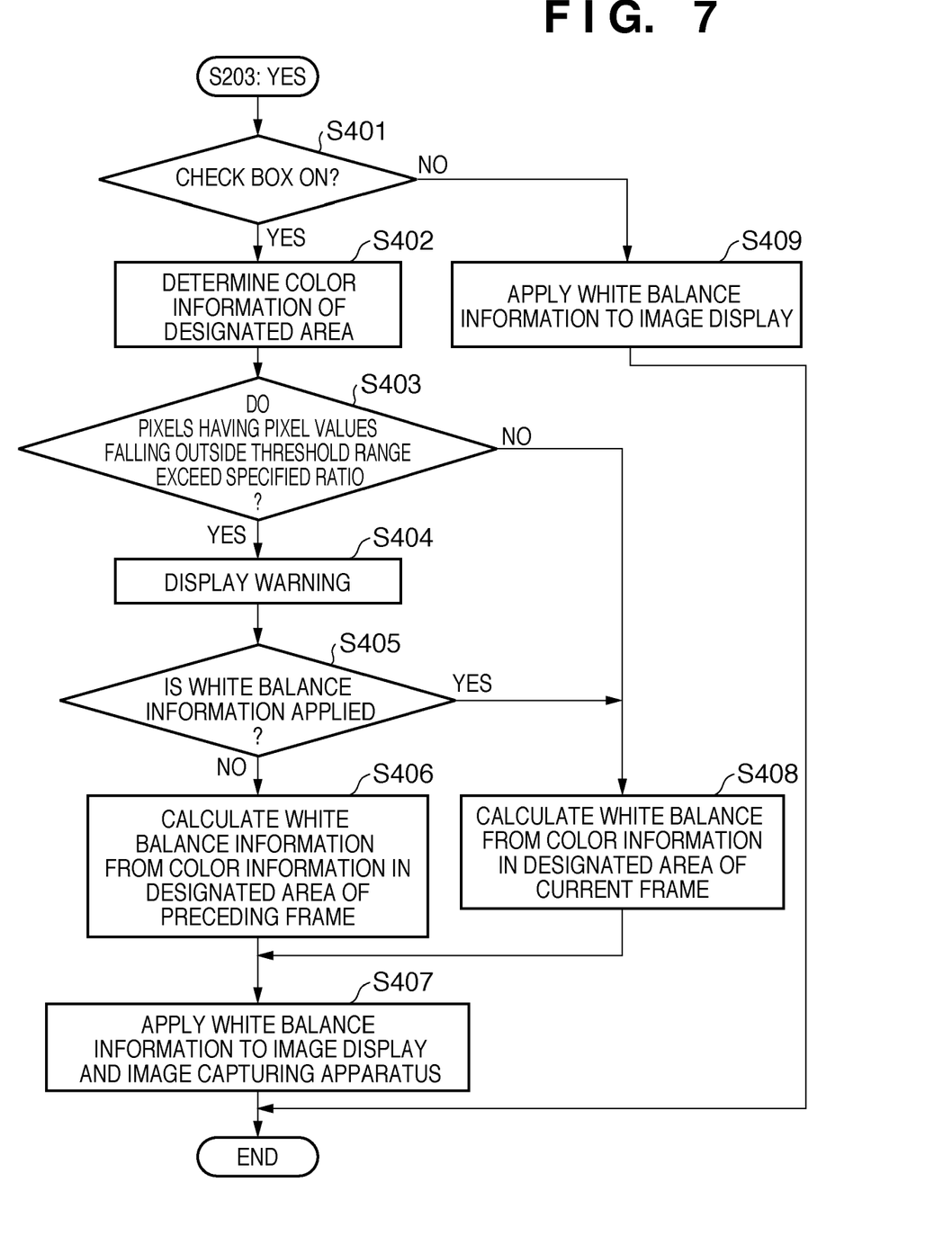
FIG. 7 is a flowchart showing white balance adjustment processing according to the third embodiment.

FIG. 7 is a flowchart showing another example of the processing according to the third embodiment. This flowchart explains a case in which the check box function according to this embodiment is applied to the second embodiment. If the user designates a white point (YES in step S203), the system control unit 210 determines the state of the check box 420 (S401). If the check box 420 is OFF, the process advances to step S409 to calculate white balance information from color information in a designated area in the current frame by the method described in association with step S207 and apply the information to image display (S409). If the check box 420 is ON, the system control unit 210 determines by the method described in association with steps S204 and S205 whether the white balance information to be calculated is proper (S402 and S403). Upon determining that proper white balance information is calculated, the system control unit 210 calculates white balance information from the color information of the current frame by the method described in association with step S207 (S408). Upon determining that the white balance information to be calculated is not proper, the system control unit 210 displays the warning message 430 described above (S404). If the user selects "YES" on the warning message 430, the system control unit 210 calculates white balance information from the color information of the current frame by the method described in association with step S207 (YES in step S405; S408). If the user selects "NO" on the warning message 430, the system control unit 210 calculates white balance information by using frames preceding the current frame by the method described in association with step S206 (NO in step S405; S406). Thereafter, the system control unit 210 applies the white balance information calculated in step S406 or S408 to the image display and the image capturing apparatus 100 (S407). Note that steps S406 and S408 are the same as steps S206 and S207 in the second embodiment.

As has been described above, each embodiment described above accurately determines whether white balance information to be applied is proper in white balance adjustment performed by remote control upon designation of a white color area on a live view image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-201090, filed Aug. 31, 2009, which is hereby incorporated by reference herein in its entirety.

What is claimed is:

1. An information processing apparatus which allows remote operation of an image capturing apparatus by communicating with the image capturing apparatus via a communication unit, the apparatus comprising:

a display unit configured to continuously receive images from the image capturing apparatus and display the images as a moving image;

a reception unit configured to receive designation of an image area by a user with respect to an image displayed on said display unit;

a first calculation unit configured to calculate white balance information based on color information in the image area of the image displayed when said reception unit received the designation;

a determination unit configured to determine, based on color information of the image area on the image displayed when the designation was received and color information of image areas on a predetermined number of images received before the image, whether white balance information calculated by said first calculation unit is proper; and an applying unit configured to apply white balance information calculated by said first calculation unit to the image capturing apparatus when said determination unit determines that the white balance information is proper, wherein if a ratio between the number of pixels, of pixels in the image area on any one of the images used for determination, which have pixel values falling outside a predetermined range and the total number of pixels in the image area exceeds a threshold, said determination unit determines that the white balance information calculated from the color information of the image area is not proper.

2. The apparatus according to claim 1, further comprising a holding unit configured to acquire and hold white balance information applied to the image capturing apparatus when the designation was received, wherein said applying unit applies the white balance information calculated by said first calculation unit to the image capturing apparatus before determination by said determination unit, and then applies the held white balance information to the image capturing apparatus if said determination unit determines that the white balance information is not proper.

3. The apparatus according to claim 1, further comprising a second calculation unit configured to calculate alternative white balance information based on the color information of the image areas on a predetermined number of images a predetermined period of time before the displayed image if said determination unit determines that the white balance information is not proper, wherein said applying unit applies the white balance information calculated by said first calculation unit to the image capturing apparatus if said determination unit determines that the white balance information is proper, and applies the alternative white balance information to the image capturing apparatus if said determination unit determines that the white balance information is not proper.

4. The apparatus according to claim 1, further comprising a selection unit configured to make a user select whether to apply white balance adjustment to only display by said display unit or to both the display and the image capturing apparatus, wherein said applying unit applies the white balance information calculated by said first calculation unit to the display by said display unit regardless of determination by said determination unit if the user selects to apply white balance adjustment to only the display by said display unit, and makes the user further select whether to apply the white balance information calculated by said first calculation unit to the image capturing apparatus, if said determination unit determines that the white balance information calculated by said first calculation unit is not proper, when the user selects to apply white balance adjustment to both the display and the image capturing apparatus.

5. A computer-readable storage medium storing a program for causing a computer to function as each unit of an information processing apparatus defined in claim 1.

6. A control method for an information processing apparatus which allows remote operation of an image capturing apparatus by communicating with the image capturing apparatus via a communication unit, the method comprising the steps of:

displaying images continuously received from the image capturing apparatus as a moving image;

receiving designation of an image area by a user with respect to an image displayed in the displaying step;

calculating white balance information based on color information in the image area of the image displayed when the designation was received in the receiving step;

determining, based on color information of the image area on the image displayed when the designation was received and color information of image areas on a predetermined number of images received before the image, whether white balance information calculated in the calculating step is proper; and applying white balance information calculated in the calculating step to the image capturing apparatus when it is determined in the determining step that the white balance information is proper, wherein if a ratio between the number of pixels, of pixels in the image area on any one of the images used for determination, which have pixel values falling outside a predetermined range and the total number of pixels in the image area exceeds a threshold, it is determined in the determining step that the white balance information calculated from the color information of the image area is not proper.

7. An information processing apparatus which allows remote operation of an image capturing apparatus by communicating with the image capturing apparatus via a communication unit, the apparatus comprising:

a display unit configured to continuously receive images from the image capturing apparatus and display the images as a moving image;

a reception unit configured to receive designation of an image area by a user with respect to an image displayed on said display unit;

a first calculation unit configured to calculate white balance information based on color information in the image area of the image displayed when said reception unit received the designation; and an applying unit configured to apply white balance information calculated by said first calculation unit to the image capturing apparatus in a case that a ratio between the number of pixels, of pixels in the image area on any one of the image displayed when the designation was received and a predetermined number of images received before the image, which have pixel values falling outside a predetermined range and the total number of pixels in the image area does not exceed a threshold.

8. The apparatus according to claim 7, further comprising a holding unit configured to acquire and hold white balance information applied to the image capturing apparatus when the designation was received, wherein said applying unit applies the white balance information calculated by said first calculation unit to the image capturing apparatus, and then applies the held white balance information to the image capturing apparatus in a case that said ratio exceeds a threshold.

* * * * *